United States Patent [19]

Moore et al.

[11] Patent Number: 4,740,870
[45] Date of Patent: Apr. 26, 1988

[54] FIBER OPTIC SYSTEM FOR BOATS

[76] Inventors: Eric L. Moore, 831 SE. 14 Ct., Ft. Lauderdale, Fla. 33335; Wayne Selogy, 3430 SW. 32nd St., Hollywood, Fla. 33023

[21] Appl. No.: 22,108

[22] Filed: Mar. 5, 1987

[51] Int. Cl.[4] .............................................. F21V 7/04
[52] U.S. Cl. ...................................... 362/32; 362/247
[58] Field of Search ................... 362/32, 228, 241, 61, 362/236, 247

[56] References Cited

U.S. PATENT DOCUMENTS

| 247,229 | 9/1881 | Wheeler | 362/32 |
|---|---|---|---|
| 3,723,722 | 3/1973 | Van Iderstine | 362/32 |
| 3,958,114 | 5/1976 | Codrino | 362/32 |
| 4,110,818 | 8/1978 | Hempsey | 362/32 |
| 4,152,752 | 5/1979 | Niemi | 362/32 |
| 4,422,719 | 12/1983 | Orcutt | 362/32 |
| 4,430,692 | 2/1984 | Papadakis | 362/32 |

FOREIGN PATENT DOCUMENTS

| 2732805 | 2/1979 | Fed. Rep. of Germany | 362/32 |
|---|---|---|---|
| 1383413 | 11/1964 | France | 362/32 |
| 2140147 | 11/1984 | United Kingdom | 362/32 |

Primary Examiner—Craig R. Feinberg
Assistant Examiner—David A. Okonsky
Attorney, Agent, or Firm—John Cyril Malloy

[57] ABSTRACT

In one embodiment, the fiber optic lighting system includes a centrally disposed light source and a plurality of fiber optic cables running from that central light source to a respective plurality of remote locations on the boat. The light source is mounted in a first transparent tube having open axial ends. A second transparent tube is concentrically disposed in close proximity to, but spaced from the first transparent tube. The first tube is removably mounted in the second tube. An internally mirrored chamber circumferentially surrounds the first and second tubes. The chamber is sealed at each axial end. The proximal ends of each fiber optic cable extends into the mirrored chamber and is in substantial engagement with the outer surface of the second tube. A light fixture is associated with each distal end of the optic fiber cables. Each light fixture includes a truncated, inverted cone with the distal end of the fiber mounted proximate the truncated vertex thereof. The outer surface of the inverted cone is mirrored. A second mirrored cone is coaxially disposed above the inverted cone. The second cone is held in place by a dome which has a mirrored inner surface. A housing supports the dome and the second cone. The housing includes light transmissive sides extending from the base of the inverted cone to the edge of the dome.

18 Claims, 1 Drawing Sheet

U.S. Patent  Apr. 26, 1988  4,740,870
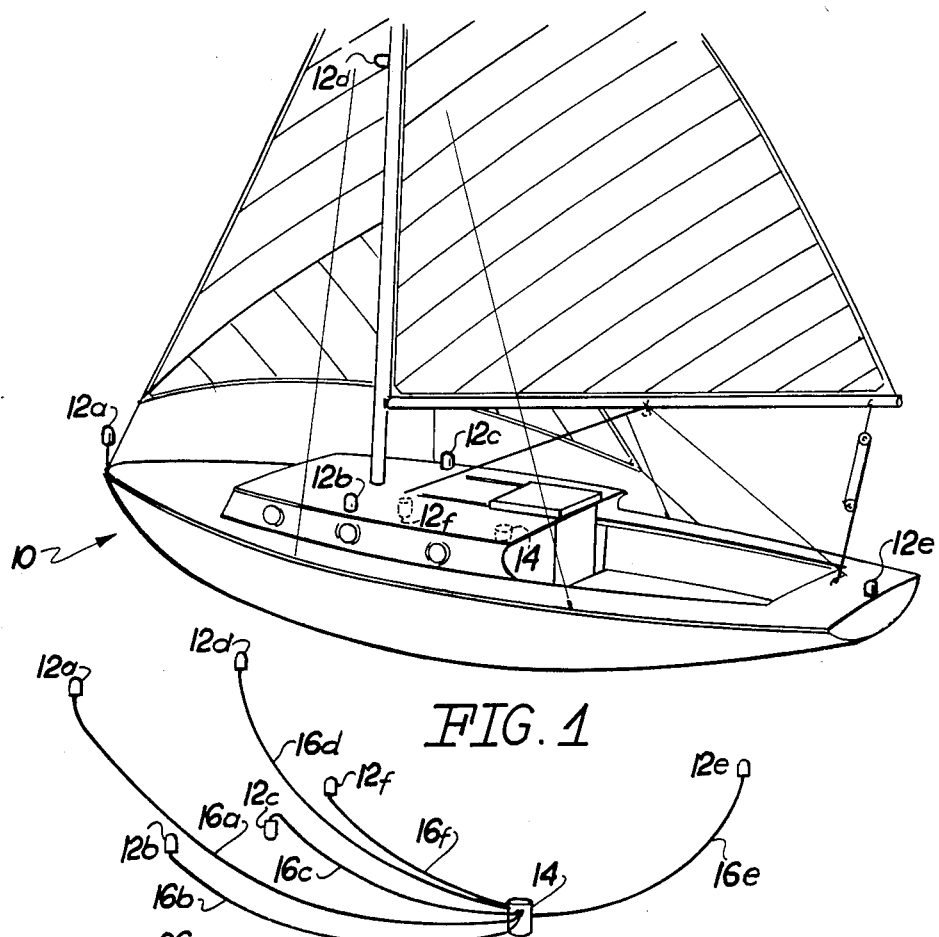
FIG. 1
FIG. 2
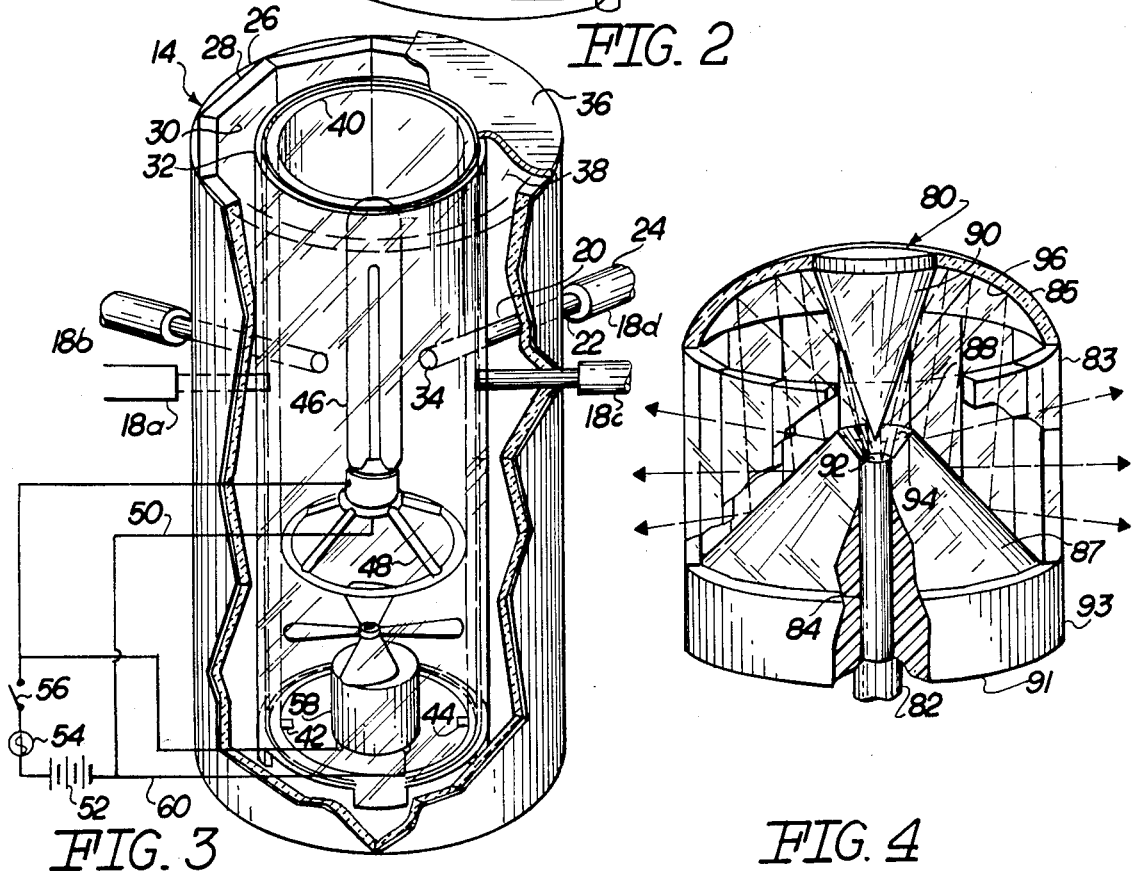
FIG. 3
FIG. 4

FIBER OPTIC SYSTEM FOR BOATS

BACKGROUND OF THE INVENTION

The present invention relates to a lighting system for boats and particularly relates to a fiber optic lighting system for watercraft.

It is well known that boats require navigational lights in order to travel on waterways at night and during periods of poor visibility. These navigational lights are normally part of an electrical lighting system that utilizes a central power source, electrical wires running or extending from that power source through a control panel to various remote locations disbursed about the boat. It is also known that these electrical systems are subject to corrosion due to the materials utilized (copper wire and various forms of metal) due to the high degree of moisture in the ambient environment. Particularly when the boat is used in salt water, the corrosion of the electrical system is accelerated and aggravated. The fact that electrical currents pass through these wires further accelerates the corrosion and deterioration of the system. Also, the lamps or bulbs in the individual light fixtures must be regularly replaced and maintained.

In general, the present invention relates to a fiber optic lighting system that utilizes a centralized light source, optical fibers running to various remote locations and light fixtures that disburse and transmit the light at those remote locations. Several U.S. patents describe prior art systems that differ from the present invention. U.S. Pat. No. 4,152,752 to Niemi discloses an optical fiber lighting system utilizing a central light source with light pipes or light guides running to various remote locations in a home. Light fixtures are attached to the distal ends of the system that disburse the light emitted from the distal end of the light pipe by various mirrored surfaces. U.S. Pat. No. 4,430,692 to Papadakis shows an optical fiber lighting system for an automobile. Light from a light bulb on the side of the automobile is transferred via an optical fiber through the wheel assembly of the car at the distal ends of the fiber. Light is transmitted across a gap near the axle of the wheel assembly from a stationary portion of the wheel to the rotary portion thereof. A light pipe on the rotatable portion of the wheel assembly carries the light to a fixture.

U.S. Pat. No. 3,723,722 to Van Iderstine, et al., shows an optical fiber lighting system for a helicopter. This system also includes a break in the optical fiber body between a central light source and proximal fiber optic cables and portions of the optical fiber body extending out on the rotary wings of the helicopter. Simple lenses are fixed to the distal ends of the optical fibers such that light is transmitted therefrom. U.S. Pat. No. 3,958,114 to Codrino discloses a light fixture within which is retained a light source. A plurality of optical fibers is held near the light source by the light fixture and light from the light source enters the various fibers at their proximal ends and leaves those optical fibers at their distal ends. U.S. Pat. No. 247,229 to Wheeler discloses an apparatus for lighting dwellings utilizing a light and special pipes which channel the light throughout the system. At the distal ends of the pipe system, spherical dispensers of polished metal, hollow glass silvered on the inside, or a similar substance is utilized to disperse the light by refraction.

In all of the systems, the specific problems involved in providing a lighting system for boats is not addressed. As stated earlier, corrosion and deterioration of the lighting system is a significant factor. Further, certain problems arise with respect to the care and maintenance of the central light source in a boat system which is different than the lighting systems for homes, automobiles or aircraft.

OBJECTS OF THE INVENTION

It is an object of the present invention to provide a fiber optic lighting system for boats and water craft.

It is an additional object of the present invention to provide a lighting system which is substantially impervious to corrosion and significant environmental deterioration.

It is another object of the present invention to provide lighting fixtures that do not require bulbs or lamps to emit light.

It is an additional object of the present invention to provide a central light source utilizing a high intensity lamp wherein the light source can be removed from a circumferential transmission chamber to enable the light source to be cleaned.

It is another object of the present invention to provide a circumferential transmission chamber into which extends the proximal ends of a plurality of optical fibers wherein the transmission chamber is sealed from dust and other materials.

SUMMARY OF THE INVENTION

In one embodiment, the fiber optic lighting system includes a centrally disposed light source and a plurality of fiber optic cables running from that central light source to a respective plurality of remote locations on the boat. The light source is mounted in a first transparent tube having open axial ends. A second transparent tube is concentrically disposed in close proximity to, but spaced from the first transparent tube. The first tube is removably mounted in the second tube. An internally mirrored, transmission chamber circumferentially surrounds the first and second tubes. The chamber is sealed at each axial end. The proximal end of each fiber optic cable extends into the mirrored chamber and is in substantial engagement with the outer surface of the second tube.

A light fixture is associated with each distal end of the optic fiber cables. Each light fixture includes a truncated, inverted cone with the distal end of the fiber mounted proximate the truncated vertex of the inverted cone. The outer surface of the inverted cone is mirrored. A second mirrored cone is coaxially disposed above the inverted cone and the vertex of the second cone points towards the distal end of the fiber and hence towards the truncated vertex of the inverted cone. The second cone is held in place by a dome which has a mirrored inner surface. A housing supports the inverted cone and the dome. The housing includes light transmissive sides extending from the base of the inverted cone to the edge of the dome such that light leaving the distal end of the fiber is reflected off the second mirrored cone, is reflected off the dome, is reflected off the inverted cone and then leaves the lighting fixture via the light transmissive sides of the fixture.

BRIEF DESCRIPTION OF THE DRAWINGS

Further objects and advantages of the present invention may best be found in the following detailed description of the preferred embodiments thereof when taken in conjunction with the accompanying drawings in which:

FIG. 1 is a perspective view of a sailboat having the fiber optic lighting system onboard;

FIG. 2 is a schematic view of the optic fiber lighting system in accordance with the principles of the present invention;

FIG. 3 is a perspective, schematic view of the central lighting unit for the fiber optic system in accordance with the principles of the present invention; and, FIG. 4 is a perspective view of one light fixture in accordance with the principles of the present invention.

DETAILED DESCRIPTION OF THE PREFERRED EMBODIMENTS

The present invention relates to a lighting system for boats and water craft and particularly relates to a fiber optic lighting system for boats.

FIG. 1 illustrates a perspective view of sailboat 10 having a plurality of light fixtures 12a, 12b, 12c, 12d, 12e, and 12f that emit light principally for navigational purposes. Also, FIG. 1 shows in dashed lines central lighting unit 14 from which extends a plurality of fiber optic cables, one cable running to each remote light fixture.

FIG. 2 is a schematic, plan view of the fiber optic lighting system in accordance with the principles of the present invention. As shown, central lighting unit 14 is coupled to a plurality of optic fiber cables 16a, 16b, 16c, 16d, 16e, and 16f. A respective fiber optic cable is associated with a corresponding light fixture (compare fiber optic cable 16a with light fixture 12a). Generally, the lighting system is a star configuration in that central lighting unit 14 is centrally disposed and each lighting fixture is coupled thereto by a single optical fiber cable. This star configuration does not require that central lighting unit 14 be in the center of the boat but simply requires that a single optical fiber means runs between the central lighting unit and a single light fixture for all of the remotely disposed light fixtures in the lighting system.

FIG. 3 illustrates a schematic, perspective view of central lighting unit 14. Optical fiber cables 18a, 18b, 18c, and 18d are connected to the central unit and the proximal end sections, one of which is distal end section 20 of fiber optic cable 18d extends into the interior of central lighting unit 14. Each fiber optic cable includes a single or a plurality of fiber optic rods. Fiber optic rod 22 is shown for cable 18d. Cable 18d also includes shield 24 which further protects fiber optic rod 22. The shield is made of a material that is impervious to many chemicals that are present in the marine environment, i.e., water, salt, etc.

Central lighting unit 14 includes a cylindrical outer chamber housing 26 which circumferentially encloses a multiplicity of longitudinally extending, mirrored wall segments, one of which is segment 28. Inner surface 30 is mirrored. The multiplicity of mirrored wall segments surround an outer transparent tube 32. Housing 26, the wall segments, the mirrored surfaces and axially sealed tube 32 define the circumferential transmission chamber. All the proximal ends of the fiber optic cables are in substantial engagement with the outer surface of tube 32. For example, end 34 of fiber optic cable 18d engages the outer surface of transparent tube 32. The ends may be affixed in some known manner to tube 32. Each axial end of central lighting unit 14 includes an axial end seal, one of which is shown as end seal plate 36. The end seals insure that interspace 38, between the mirrored wall segments (see segment 28) and the outer transparent tube 32 is maintained in a clean and dust proof environment. This seal enables light transmitted through transparent 32 to enter into proximal end 34 and the other proximal ends of the optical fiber cables without significant diffusion. Further, it enables the distal ends of the cables to be maintained in a secure environment with the outer surface of transparent tube 32.

Outer tube 32 and in close proximity, but spaced from an inner transparent tube 40. Inner tube 40 is removably mounted within tube 32 by tabs 42 and 44 radially extending inward from the lower axial end of tube 32. Other mounting means can be used. Both axial ends of inner tube 40 are open to allow for the passage of air through the tube. Centrally disposed within inner tube 40 is a high intensity lamp 46. Lamp 46 is mounted within tube 40 by supports 48 that include four radial and downwardly extending legs affixed to a circumferential rib attached to the inner surface of inner tube 40. A pair of electrical lines 50 extend from high intensity lamp 46 and connect the lamp to a battery 52, a fuse 54 and a control switch 56.

In order to assist the flow of air pass lamp 46, a fan 58 is also internally mounted within tube 40. Although the mounting for fan 58 is not shown, a similar mounting such as support structure 48 can be used for the fan. Other types of mountings such as grids, screens, radially extending ribs, or other means can be used as long as air can enter one axial end of lighting unit 14, pass by lamp 46, and exit the other axial end of the unit. Fan 48 is electrically connected in parallel with lamp 46 by a pair of electrical lines 60.

Inner tube 40 can be removed from central lighting unit 14 in order to replace lamp 46, and more importantly, in order to clean the lamp and the various surfaces of tube 40. In order to accomplish this removal, fan 58 may be connected to outer housing 26 of central lighting unit 14. Also, it is not necessary that fan 58 be disposed in the interior of inner tube 40. To assist in the removal of inner tube 40, electrical leads 50 may be exceptionally long or may include a coupling/decoupling electrical plug that would be decoupled when tube 40 is removed. Since lamp 46 is connected to support structure 48 which in turn is affixed to inner tube 40, the removal of inner tube 40 facilitates the cleaning and replacing of the lamp itself. In a marine environment, the cleaning of the central lighting unit is critical. Dust, grit and salt deposition on the lamp and on the inner tube would degrade the quality, amount and intensity of the light transmitted into the various optic fiber cables. The removability of the light source alleviates these problems. Further, the inner surface of outer tube 32 can be cleaned when tube 40 is removed.

As stated earlier, central lighting unit 14 is disposed at the central location in the star configuration of the fiber optic lighting system as shown in FIG. 2. The proximal ends of the plurality of fiber optic cables are affixed to the central lighting unit. The fiber optic cables are laid throughout the boat and run to various remote locatoins distant from the central unit. At those remote locations, a lighting fixture is disposed.

FIG. 4 shows a perspective view of lighting fixture 80. Optic fiber cable 82 has a distal end section 84 extending into base 89 of the lighting fixture. The light fixture included is a housing 93 comprising base 91 light transmissive side walls 83 and dome 85.

A truncated, inverted cone 87 has its base mounted to housing 93. The outer surface of inverted cone 87 is mirrored. Truncated vertex 88 of inverted cone 87 is open to a second, mirrored cone 90 that is coaxially disposed with respect to inverted cone 87 on dome 85. A distal end 92 of optic fiber cable 82 is spaced away from the plane of the truncated vertex 88 of inverted cone 87. A mirrored, frusto-conical surface 94 extends between the truncated vertex 88 and the periphery of distal end 92. Frustoconical surface 94 is mirrored. The inner surface 85 of dome 84 is also mirrored. Cone 90 is mounted on the dome and light transmisive sides 83 extend from the periphery of dome 85 to the base of inverted cone 87.

In operation, the fiber optic lighting system carries light from high intensity lamp 46 (when switch 56 is closed) to each of the remote locations. Specifically, light emitted from lamp 46 passes through tubes 40 and 32 and enters the proximal ends of each optical fiber cable. Mirrored surfaces 30 and central unit 14 reflect any unused light and assist in the launching of light into the proximal ends of the optic fiber cables. The light travels through the optic fiber cables and is emitted from distal end 92 in the internal region of light fixture 80. The light is then reflected many times off the mirrored surfaces in the fixture. For example, some light is reflected from cone 90, mirrored surface 96 of dome 85, and the mirrored surface of inverted cone 87. The light then passes through light transmissive walls 83 of the light fixture and exits the fiber optic lighting system.

Of course, it is not necessary that all the light fixtures have a light transmissive sides extending 360 degrees about the fixture. Some fixtures may only emit light on their starboard side. Further, light transmissive sides 83 may include a color filter such that light transmitted from fixture 80 on the starboard side of the boat would be red whereas light transmitted from the port side of the boat would be green.

The claims appended hereto are meant to cover modifications and changes within the scope and spirit of the present invention. It is preferred that the optic fiber cable is one-quarter inch in diameter. In a preferred embodiment, some type of mechanism must be provided to allow air flow through inner tube 40. For example, a vertical orientation for the central lighting unit would cause air to pass through inner tube 40 and hence pass high intensity lamp 46 enabling the lamp to be cooled. This may be sufficient air flow to maintain lamp 46 within the proper operating temperatures. If this is not the case, fan 58 may be utilized to cool the lamp. The claims appended hereto are meant to cover these and other features.

What we claim is:

1. A fiber optic lighting system for boats comprising:
   a light source centrally disposed in a first transparent tube, said first transparent tube having open axial ends;
   a second transparent tube concentrically disposed in close proximity but spaced from said first transparent tube;
   means for removably mounting said first transparent tube from said second transparent tube;
   an elongated internally mirrored chamber defining a surface circumferentially surrounding said first and second transparent tubes and having a seal at each axial end thereof extending from said second transparent tube to at least the internally mirrored surface of said chamber;
   a plurality of flexible, elongated optical fiber means for carrying light emitted by said light source, each fiber means having a proximal end in substantial engagement with an outer surface of said second transparent tube, a body portion adapted to be run to remote locations distant from said light source on said boat and a distal end remote from said proximal end that emits light carried by the fiber means;
   a plurality of light fixtures, a respective light fixture corresponding to a respective fiber means and disposed at the distal end thereof, each light fixture including;
   a truncated inverted cone with said distal end of said fiber means mounted proximate the truncated vertex of said inverted cone, said distal end launching light coaxially from said truncated vertex, the outer surface of said inverted cone being mirrored;
   a second mirrored cone defining a surface coaxially disposed above said inverted cone, the vertex of said second cone pointing towards said distal end such that emitted light therefrom is reflected off the mirrored surface of said second cone;
   a dome at the base of said second cone having a concave, mirrored inner surface such that said emitted light and the reflected light from said second cone is reflected from said concave surface and is directed to the mirrored outer surface of said inverted cone; and,
   a housing supporting said inverted cone and said dome and receiving a distal end section of said fiber means, said housing having a light transmissive portion extending from a base section of said inverted cone to a edge section of said dome such that light emitted from said fiber means and reflected from the mirrored surfaces is transmitted from said light fixture.

2. A lighting system as claimed in claim 1 including means for promoting air flow through said first transparent tube and about said light source.

3. A lighting system as claimed in claim 2 wherein said means for promoting air flow is a fan adapted to blow air through said first transparent tube.

4. A lighting system as claimed in claim 3 wherein said fan is mounted inside said first transparent tube.

5. A lighting source as claimed in claim 4 wherein said light source is a high intensity lamp and said fan is mounted at one axial end of said first transparent tube.

6. A lighting system as claimed in claim 5 including a lamp support structure for concentrally locating said lamp within said first transparent tube.

7. A lighting system as claimed in claim 6 including means for coupling said lamp and said fan to an electrical power source.

8. A lighting system as claimed in claim 1 wherein said light source is a high intensity lamp.

9. A lighting system as claimed in claim 8 wherein the plurality of proximal ends of said fiber means is circumferentially aligned about said second transparent tube in a plane normal to said first and second transparent tubes, said plane passing through an illuminating portion of said lamp.

10. A lighting system as claimed in claim 9 wherein proximal end sections of said plurality of fiber means extend through said chamber.

11. A lighting system as claimed in claim 10 wherein said chamber is defined by a chamber housing having internally mirrored walls and sealed ports through which extend said proximal end sections.

12. A lighting system as claimed in claim 11 wherein said chamber housing is cylindrical and is coaxially with said first and second transparent tubes.

13. A lighting system as claimed in claim 12 wherein said internally mirrored walls comprise a multiplicity of longitudinally extending, mirrored wall segments.

14. A lighting system as claimed in claim 1 wherein said body portions of said fiber means are shielded by a protective layer of material.

15. A lighting system as claimed in claim 1 wherein said light transmissive portion of said housing for said light fixture circumferentially surrounds said inverted cone thereby transmitting light in a 360 degree radius.

16. A lighting system as claimed in claim 15 wherein a section of said light transmissive portion includes a color filter for said transmitted light.

17. A lighting system as claimed in claim 1 wherein the diameter of said truncated vertex of said inverted cone is greater than a diameter of said distal end of said fiber means and said light fixture includes a mirrored, frusto-conical surface extending from said distal end to said truncated vertex.

18. A lighting system as claimed in claim 17 wherein the second cone vertex is in close proximity to the plane defined by said truncated vertex.

* * * * *